United States Patent
Pas et al.

(10) Patent No.: US 6,668,860 B1
(45) Date of Patent: Dec. 30, 2003

(54) SWITCHING DEVICE FOR OPTIONALLY PASSING A FLOW OF MEDIUM THROUGH A FIRST OR SECOND TREATMENT MEMBER

(75) Inventors: Peter Alexander Josephus Pas, Lengel (NL); Fred Greter, Oosterbeek (NL)

(73) Assignee: Indufil B.V., Zevenaar (NL)

( * ) Notice: Subject to any disclaimer, the term of this patent is extended or adjusted under 35 U.S.C. 154(b) by 0 days.

(21) Appl. No.: 10/110,688

(22) PCT Filed: Oct. 18, 2000

(86) PCT No.: PCT/NL00/00750

§ 371 (c)(1),
(2), (4) Date: Aug. 27, 2002

(87) PCT Pub. No.: WO01/29467

PCT Pub. Date: Apr. 26, 2001

(30) Foreign Application Priority Data

Oct. 18, 1999 (NL) .............................................. 1013330

(51) Int. Cl.[7] .............................................. F16K 35/14
(52) U.S. Cl. .................................. 137/599.14; 137/545
(58) Field of Search ....................... 137/599.14, 599.15, 137/545

(56) References Cited

U.S. PATENT DOCUMENTS

| 3,116,755 | A | * | 1/1964 | McNeal | ................. 137/599.14 |
| 3,935,108 | A | * | 1/1976 | Forgues | ...................... 210/340 |
| 4,196,752 | A |   | 4/1980 | Niskanen | |
| 5,129,420 | A |   | 7/1992 | Johnson | |
| 5,383,491 | A | * | 1/1995 | Heilman | ...................... 137/597 |

FOREIGN PATENT DOCUMENTS

| FR | 1 130 128 | 1/1957 |
| GB | 834 759 | 5/1960 |
| GB | 2 236 829 | 4/1991 |
| GB | 2 260 387 | 4/1993 |

* cited by examiner

Primary Examiner—Stephen M. Hepperle
(74) Attorney, Agent, or Firm—Young & Thompson

(57) ABSTRACT

A switching device for optionally passing a flow of medium, such as a highly pressurized gas, through a first or second treatment member (2, 3), in which the medium is subjected to a treatment, such as filtration, heating, cooling or the like, comprises a medium inlet, a medium outlet and two distribution valves (1, 5), of which the valve bodies, which are provided with passages, are attached to a common rotation pin (10). For safety's sake, safety valves (12, 13, 14, 15) are arranged in the connections between distribution valves arranged at the inlet and at the oulet and the two treatment members.

3 Claims, 3 Drawing Sheets

SWITCHING DEVICE FOR OPTIONALLY PASSING A FLOW OF MEDIUM THROUGH A FIRST OR SECOND TREATMENT MEMBER

The invention relates to a switching device for optionally passing a flow of medium, for example a highly pressurized gas, through a first or second treatment member, in which the said medium is subjected to a treatment, such as filtration, heating, cooling or the like, comprising:

a medium inlet, a medium outlet and two distribution valves, of which the valve bodies, which are provided with passages, are attached to a common rotation pin, all this in such a manner that, in one limit position of the said rotation pin, the inlet and the outlet of the switching device are connected to the first treatment member, and in the other limit position of the said rotation pin, the inlet and the outlet of the switching device are connected to the second treatment member, and safety valves arranged in the connections between the distribution valves and the two treatment members.

A switching device of this type is known from GB-A-2236829.

A switching device as indicated in the preamble can be used, for example to pass natural gas which is at a high pressure (for example 200 bar) through one of the two filters alternately. While the one filter is in use, the other filter is replaced and/or purged with, for example, nitrogen. If a distribution valve, usually a ball valve, leaks, gas enters the filter which at that time is being cleaned by purging or replaced. This may be very dangerous. Therefore safety valves are arranged in the connections between the distribution valves and the two treatment members.

If a distribution valve leaks in the direction of a treatment member which is not in operation, leakage gas is blocked by a safety valve.

According to the invention two safety valves in the connections between the distribution valves connected to the inlet and outlet and the first treatment member are arranged on a common rotation pin and the valve bodies of the two safety valves in the connections between the distribution valves connected to the inlet and outlet and the second treatment member are likewise arranged on a common rotation pin.

It is important that the valves be switched correctly during the transfer from one treatment member to the other. For this purpose, a pressure-equalization line having at least one shut-off member extends between the two treatment members and a switching system for switching the distribution valves and safety valves is added to the device, acting in such a manner that, to switch over the supply and discharge of medium to and from one treatment member to and from the other treatment member, the following switching operations take place in succession:

the valve bodies of the safety valves in the supply and discharge lines of the treatment member which is not operating are moved into the open position, in which the valve bodies of the safety valves in the supply and discharge lines of the operating treatment member are blocked against rotation, the at least one shut-off member in the pressure-equalization line is opened, the valve bodies of the distribution valves are moved into a position in which the treatment member which was not previously operating is activated, and the operating treatment member is deactivated, the treatment member which has just been activated being blocked against rotation, the at least one shut-off member in the pressure-equalization line is closed, and the valve bodies of the safety valves in the inlet and outlet of the treatment member which has just been deactivated are moved into the closed position.

In this way, the valves of the system could be switched electronically. However, it is safer if the switching system contains the following parts:

a circular disc which is arranged on the common axis of the distribution valves and has two cutouts, which are in the form of segments of a circle and follow one another over the circumference thereof, a circular disc which is arranged on the common axes of each of the safety valves and has one cutout in the form of a segment of a circle on the circumference, the radius of the circle-segment cutouts being equal to that of the circular discs, and imaginary circles around the circumferences of the discs which are arranged next to one another overlapping one another over the shape and size of one circle-segment cutout.

The invention will now be explained with reference to the figures, which illustrate an exemplary embodiment.

Figure 1:
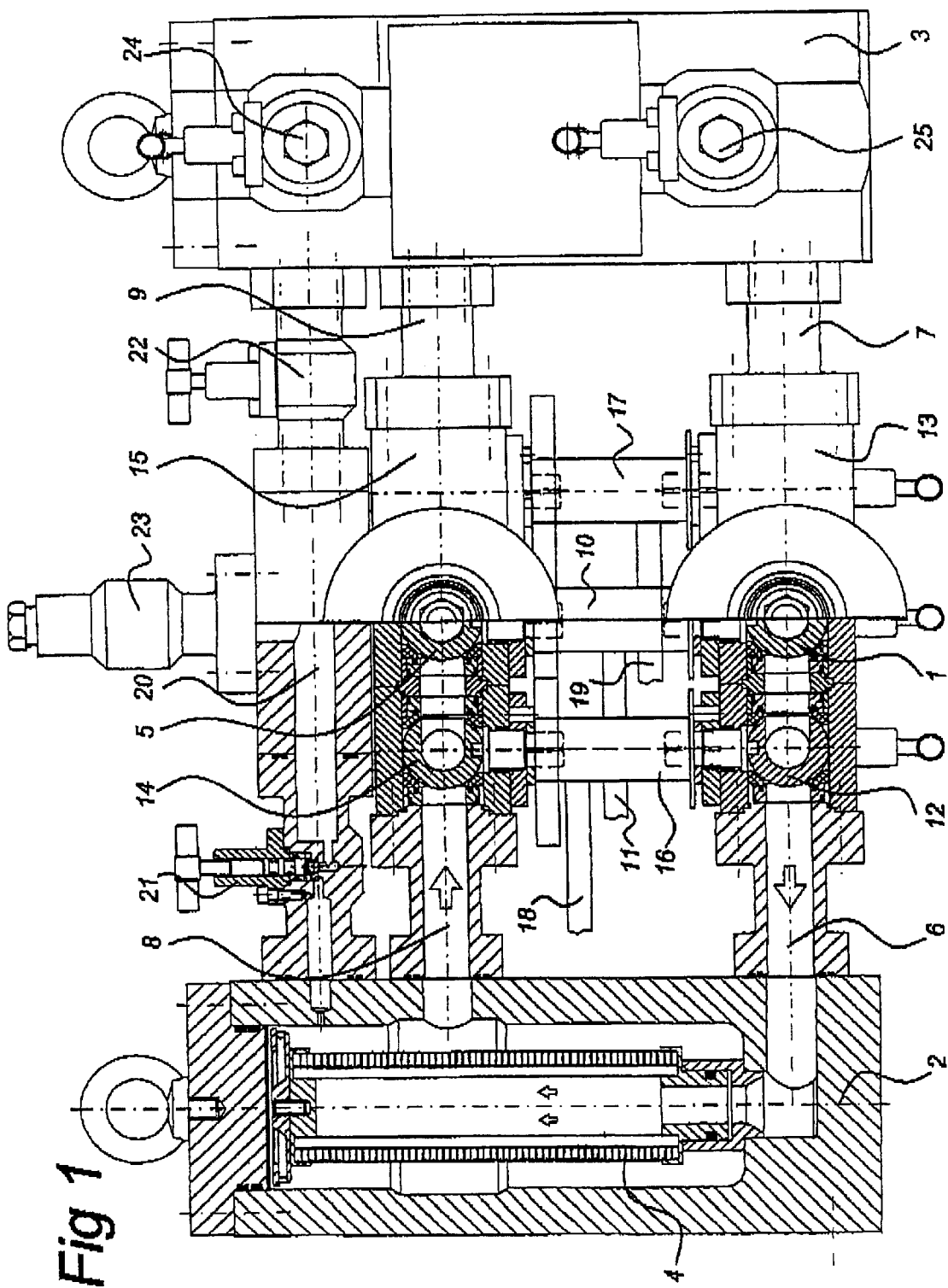
FIG. 1 shows a side view, partially in section, of the device.
Figure 2:
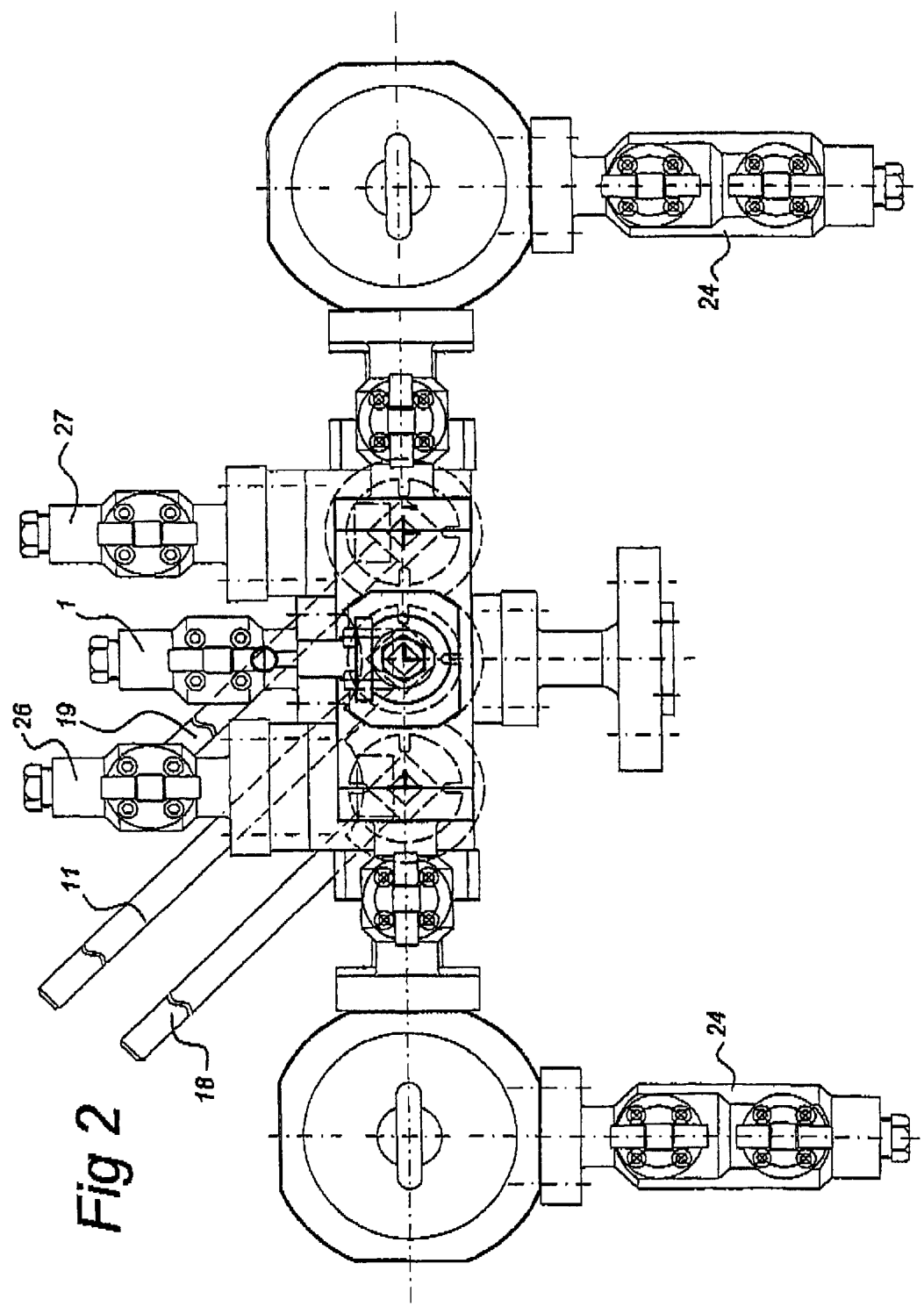
FIG. 2 shows a plan view of the device.
Figure 3C:
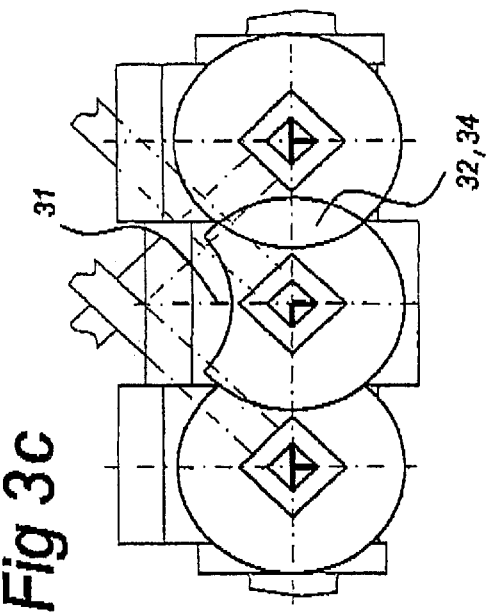
Figure 3D:
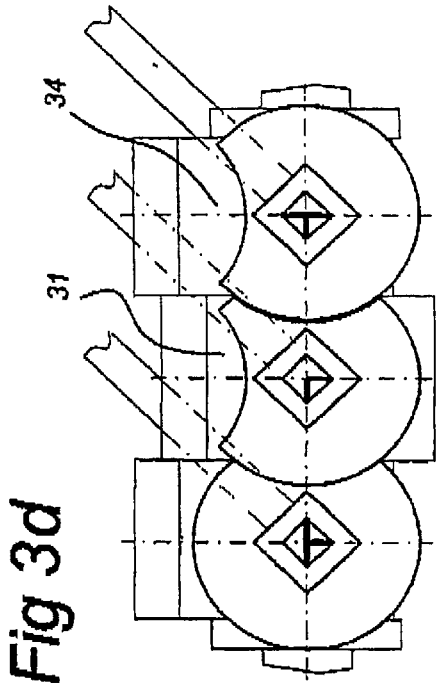
Figure 3A:
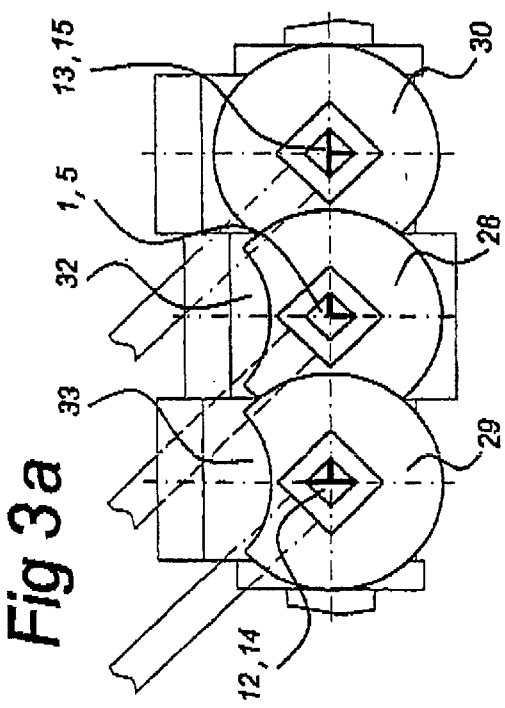

FIGS. 3a, b, c, d show various stages involved in switching the flow of medium from one treatment member to the other treatment member.

The switching device illustrated is able to guide a gaseous or liquid medium, via an inlet distribution ball valve 1, to a treatment member 2 or a treatment member 3 as desired. In the exemplary embodiment illustrated, each of the treatment members 2 and 3 comprises a filter 4 for filtering a highly pressurized gas stream. The treatment members could also, for example, comprise heating or cooling units, and the gas stream may also be a liquid stream.

The filtered gas leaves the switching device via an outlet distribution ball valve 5, which can likewise be alternately connected to the treatment member 2 or the treatment member 3, The connecting line between the inlet distribution ball valve and the treatment member 2 is denoted by 6, the connecting line between the inlet distribution ball valve 1 and the treatment member 3 is denoted by 7, the connecting line between the inlet distribution ball valve 5 and the treatment member 2 is denoted by 8, and the connecting line between the outlet distribution ball valve 5 and the treatment member 3 is denoted by 9.

The inlet distribution ball valve 1 and the outlet distribution ball valve 5 are mounted on a common rotation pin 10 which can be rotated through 90° by means of a lever 11.

A safety ball valve 12, 13, 14, 15, respectively, is arranged in each of the lines 6, 7, 8 and 9.

The safety ball valves 12 and 14 are mounted on a common rotation pin 16, and the safety ball valves 13, 15 are mounted on a common rotation pin 17, The pins 16 and 17 can be rotated through 90° by means of a lever 18 and 19, respectively. The medium feed connection and the medium discharge connection are situated on the same side of the switching device.

The treatment members 2 and 3 are connected to one another via a pressure-equalization line 20. This line 20 can be opened and closed by means of two shut-off members 21, 22. In the center, the pressure-equalization line 20 is connected to an inlet 23 for purge medium, such as nitrogen.

This medium can be used to purge the pressure-equalization line. Each of the treatment members 2, 3 has a vent port 24 and a drain 25. Purge medium is fed to the filters via bleeds 26, 27.

A circular disc 28, 29, 30 is mounted on each of the said common pins 10, 16, 17, The discs are of the same diameter, The disc 28 arranged on the rotation pin 10 of the distribution ball valves 1 and 5 is provided, on its circumference, with two cutouts 31, 32, which are in the form of segments of a circle, follow one another and have a radius which corresponds to that of the discs 28, 29, 30. The circular discs 29, 30 arranged on the rotation pins 16, 17 of the safety ball valves 12, 14, 13, 15 are provided, on their circumference with a single cutout 33 or 34, respectively, which is in the form of a segment of a circle. These cutouts are congruent with the cutouts 31, 32. FIG. 3 shows how the discs are positioned with respect to one another and how they can be switched The position of the channels in the various ball valves is indicated by a thick T-shaped line.

FIG. 3a shows the position of the ball valves in which medium supplied is passed via ball valves 1 and 13 to the treatment member 3 and filtered medium is passed via ball valves 15 and 5 to the outlet. If the valves 1, 5 are leaking, it is impossible for medium to flow to the treatment member 2. The disc 29 can be rotated, the disc 28 is blocked a t rotation by the disc 29, and the disc 30 is blocked against rotation by the disc 28.

Figure 3B:
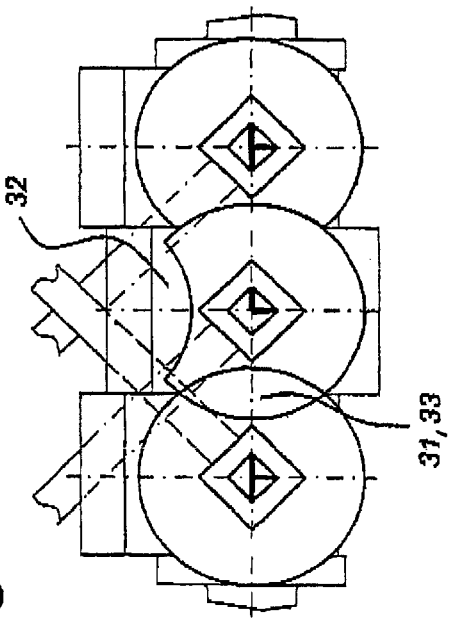

Rotating the disc 29 90° to the right, as shown in FIG. 3b, by means of the lever 18 causes the circle-segment cutouts 31, 33 to come to lie opposite one another, and the rotation blocking of the disc 28 is eliminated. The safety ball valves 12, 14 are then in the open position. Medium still flows only to and from the treatment member 3.

FIG. 3c shows that the distribution ball valves 15 have also been rotated through 90° by means of levers 11, with the result that medium supplied starts to flow to the filter 2 and medium which has been filtered in the said filter 2 flows to the outlet. The circle-segment cutouts 32, 34 of the discs 28, 30 now lie opposite one another. Before the valves are moved into the position shown in FIG. 3c, the shut-off members 21 and 22 in the pressure-equalization line 20 are opened.

Finally, FIG. 3d shows how the safety ball valves 13, 15 have been rotated through 90° by means of the lever 19 and moved into the closed position. The medium which is to be treated then flows to the treatment member 2, and if the distribution ball valves 1, 5 were to leak, it would be impossible for the medium to reach the other treatment member 3 while it is being purged or replaced. Before the valves are switched to the position shown in FIG. 3d, the pressure-equalization line 20 is closed by means of the shut-off members 21 and 22 which are used for this purpose.

Numerous variants are possible within the scope of the claims.

What is claimed is:

1. Switching device for optionally passing a flow of medium, for example a highly pressurized gas, through a first or second treatment member, in which the said medium is subjected to a treatment, such as filtration, heating, cooling or the like, comprising:

a medium inlet, a medium outlet and two distribution valves (1, 5), of which the valve bodies, which are provided with passages, are attached to a common rotation pin (10), all tis in such a manner that, in one limit position of the said rotation pin (10), the inlet and the outlet of the switching device are connected to the first treatment member (2), and in the other limit position of the said rotation pin, the inlet and the outlet of the switching device are connected to the second treatment member (3), and safety valves (12, 13, 14, 15) arranged in the connections between the distribution valves (1, 5) and the two treatment members (2, 3), characterized in that the valve bodies of the two safety valves (12, 14) in the connections (6, 8) between the distribution valves (1, 5) connected to the inlet and outlet and the first treatment member (2) are arranged on a common rotation pin (16), and the valve bodies of the two safety valves (13, 15) in the connections (7, 9) between the distribution valves (1, 5) connected to the inlet a outlet and the second treatment member (3) are likewise arranged on a common rotation pin (17).

2. Switching device according to claim 1, characterized in th a pressure-equalization line (20) having at least one shutt-off member (21, 22) between the two treatment members (2, 3), and in that a switching system for switching the distribution valves and safety valves is added to the device, acting in such a manner that, to switch over e supply and discharge of medium to and from one treatment member to the other treatment member, the following switching operations take place in succession:

the valve bodies of the safety valves in the supply and discharge lines of the treatment member which is not operating are moved into the open position, in which the valve bodies of the safety valves in the supply and discharge lines of the operating treatment member are blocked against rotation, the at least one shut-off member in the pressure-equalization line is opened, the valve bodies of the distribution valves are moved into a position in which the treatment member which was not previously operating is activated, and the operating treatment member is deactivated the treatment member which has just been activated being blocked against rotation, the at least one shut-off member in the pressure-equalization line is closed, and the valve bodies of the safety valves in the inlet and oulet of the treatment member which has just been deactivated are moved into the closed position.

3. Switching device according to claim 2, characterized in that the said switching system contains the following parts:

a circular disc (28) which is arranged on the common axis of the distribution valves and has two cutouts (31, 32), which are in the form of segments of a circle and follow one another over the circumference thereof, a circular disc (29, 30) which is arranged on the common axes of the safety valves and has one cutout (33, 34) the form of a segment of a circle on the circumference, the radius of the circle-segment cutouts being equal to that of the circular discs, and imaginary circles around the circumferences of the discs which are arranged next to one another overlapping one mother over the shape and size of one circle-segment cutout.

* * * * *